United States Patent Office 3,446,796
Patented May 27, 1969

3,446,796
SULFATION OF XANTHOMONAS
HYDROPHILIC COLLOID
Richard G. Schweiger, San Diego, Calif., assignor to Kelco Company, San Diego, Calif., a corporation of Delaware
No Drawing. Filed Nov. 16, 1966, Ser. No. 594,666
Int. Cl. C08b 19/00, 19/02
U.S. Cl. 260—234    16 Claims

ABSTRACT OF THE DISCLOSURE

An essentially undegraded sulfate ester of a Xanthomonas hydrophilic colloid and salts thereof. The process for preparing an essentially undegraded sulfate ester of a Xanthomonas hydrophilic colloid by acidifying the Xanthomonas hydrophilic colloid in aqueous medium, precipitating the acidified colloid, removing substantially all of the water from said precipitated colloid while maintaining the colloid in a wetted state, and then reacting the wetted colloid with a sulfur trioxide-dialkyl amide sulfation complex in which the amine has a formula

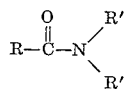

wherein R' is a lower alkyl radical and R is selected from the class consisting of hydrogen and a lower alkyl radical. The essentially undegraded sulfate esters of a Xanthomonas hydrophilic colloid and salts thereof are useful in forming thickened glues.

---

This invention relates to a method of preparing undegraded sulfate esters of Xanthomonas hydrophilic colloids. Further, the invention pertains to essentially undegraded sulfate esters of Xanthomonas hydrophilic colloids and salts thereof.

An object of the present invention is to provide a process for producing sulfate esters of Xanthomonas hydrophilic colloids in which the polymeric structure of the colloid remains relatively undegraded.

A further object of this invention is to provide essentially undegraded sulfate esters of Xanthomonas hydrophilic colloids and salts of such esters.

Additional objects will appear from a reading of the specification and claims which follow.

In accord with my invention, I first activate the Xanthomonas hydrophilic colloid so that it can be more readily sulfated. Activation is accomplished by acidifying the colloid in an aqueous medium and then dehydrating it prior to reaction. After the colloid has been acidified and hydrated, it is precipitated from the aqueous medium by the addition of an organic solvent which is miscible with water but which is not a solvent for the Xanthomonas hydrophilic colloid. Suitable solvents are the lower alcohols such as methanol, ethanol, propanol, isopropanol, etc., a simple ketone such as acetone, glacial acetic acid, and lower dialkyl amides, as hereinafter described, such as dimethyl formamide, dimethyl propionamide, diethyl acetamide, and the like. A preferred solvent for precipitating the material from solution is acetone.

After precipitating the Xanthomonas hydrophilic colloid, it is washed with one of the aforementioned water-miscible solvents (preferably acetone) to remove substantially all of the water. If a lower alcohol is used for the above precipitation, it is preferably removed prior to the sulfation reaction by washing with acetone or an amide as represented by the following formula:

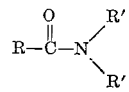

In the above formula R and R' may be a lower alkyl radical such as, for example, a methyl or ethyl radical. In addition, R can be hydrogen. A preferred amide for use in my process is dimethyl formamide. Other suitable amides may be employed, however, such as dimethyl acetamide, diethyl acetamide, and dimethyl propionamide. If desired, as set forth previously, the amide may be added directly to the water solution of Xanthomonas hydrophilic colloid to precipitate the colloid from solution. Such procedure is not generally employed because the quantities of amide required to cause precipitation are relatively large and the procedure is not as effective as precipitation with acetone.

The above procedure is designed to remove essentially all of the water from the precipitated colloid and, at the same time, to remove any substantial amounts of solvents, such as a lower alcohol, which would provide undesired side reactions during the subsequent sulfation reaction.

The Xanthomonas hydrophilic collids which are sulfated according to my invention are colloidal materials which are produced by bacteria of the genus Xanthomonas. Illustrative of such colloidal materials is the hydrophilic colloid produced by the bacterium Xanthomonas campestris. This colloidal material is a polymer containing mannose, glucose, potassium glucuronate and acetyl radicals. The said colloid, which is a high molecular weight, exocellular material, may be prepared by the bacterium Xanthomonas campestris, by whole culture fermentation of a medium containing 2–5% commerical glucose, an organic nitrogen source, dipotassium hydrogen phosphate and appropriate trace elements. The incubation time is approximately 96 hours at 28° C., aerobic conditions. In preparing the colloid as aforesaid, it is convenient to use corn steep liquor or distillers' dry solubles as an organic nitrogen source.

It is expedient to grow the culture in two intermediate stages to promote vigorous growth of the bacteria. These stages may be carried out in a media having a pH of about 7. In a first stage a transfer from an agar slant to a dilute glucose broth may be made and the bacteria cultured for 24 hours under vigorous agitation and aeration at a temperature of about 30° C. The culture so produced may then be used to inoculate a higher glucose (3%) content broth of larger volume in a second intermediate stage. In this stage the reaction may be permitted to continue for 24 hours under the same conditions as the first stage. The culture so acclimated for use with glucose by the aforementioned first and second stages is then added to the final glucose-containing fermentation medium.

In the aforesaid method of preparation of Xanthomonas campestris hydrophilic colloid, a loopful of organism from the agar slant is adequate for the first stage comprising 200 milliliters of the said glucose media. In the second stage that material resulting from the first stage may be used together with 9 times its volume of a 3% glucose media. In the final stage the material produced in the second stage may be admixed with 19 times its volume of the final media. A good final media may contain 3% glucose, 0.5% distillers' dry soluble, 0.5% dipotassium phosphate, 0.1% magnesium sulphate having 7 molecules of water of crystallization and water. The reaction in the final stage may be satisfactorily carried out for 96 hours at 30° C. with vigorous agitation and aeration. The resulting *Xanthomonas campestris* colloidal material can be recovered by precipitation in methanol of the clarified mixture from the fermentation. This resulting material may also be designated as pseudoplastic, heteropolysaccharide hydrophilic colloid produced by the bacterial species *Xanthomonas campestris.*

Other Xanthomonas hydrophilic colloids may be prepared by repeating the above procedure for producing a *Xanthomonas campestris* hydrophilic colloid by substituting known Xanthomonas bacteria or organisms, i.e., *Xanthomonas carotae, Xanthomonas incanae, Xanthomonas begoniae,* and *Xanthomonas malvacearum,* for the bacterium, *Xanthomonas campestris.*

As stated previously, the Xanthomonas hydrophilic colloid employed as a reactant in my process must first be suitably activated. Activation may conveniently be accomplished in conjunction with the process for preparing the Xanthomonas hydrophilic colloid by directly acidifying the final fermentation beer containing the colloid. After acidification of the beer by the addition of an acid, such as hydrochloric acid, to a pH of about 2, the acidified hydrated colloid is precipitated and dehydrated through addition of a water miscible organic solvent as described previously. Alternatively, of course, the activated colloid may be prepared by adding the dried Xanthomonas hydrophilic colloid or a salt thereof to water, thereafter acidifying and then precipitating the colloid by the addition of a water miscible organic solvent.

Following the activation of the Xanthomonas hydrophilic colloid, the material is maintained in a wetted state with the solvent or lower dialkyl amide employed in the final washing step. It is quite important that the activated colloid not be allowed to dry prior to the succeeding sulfation reaction. Should this occur, the colloid may become deactivated to some extent such that it will not react in the desired manner during the sulfation reaction.

The wetted and activated Xanthomonas hydrophilic colloid is then reacted with a complex of sulfur trioxide and a lower dialkyl amide of the type described previously. Preferably, the amide is dimethyl formamide or dimethyl acetamide. The complex is formed by adding sulfur trioxide to the lower dialkyl amide with cooling of the reaction mixture to maintain the temperature below about 40° C. Preferably, a molar excess of the amide, such as dimethyl formamide, is employed for reaction with the sulfur trioxide. A suitable excess which I have employed uses 2 moles of the amide for each mole of sulfur trioxide. The resulting complex is a crystalline solid which is in a wetted condition due to the excess of amide generally employed in its formation. The wet crystalline solid material can be maintained under refrigeration, for example, at about 4 to 5° C., until ready for use.

The activated Xanthomonas hydrophilic colloid is preferably reacted with the sulfur trioxide-amide complex in a closed mixer provided with a cooling jacket. The presence of moisture is undesirable since water will react preferentially with the sulfur trioxide-amide complex to form sulfuric acid, which produces degradation of the polymeric structure of the colloid. It is for this reason that the reaction is preferably carried out in a closed system or in an equivalent manner such as by blanketing the reaction mixture with a dry inert gas.

The sulfation reaction is carried out under agitation to promote an even reaction rate. Since both the sulfur trioxide-amide complex and the activated colloid are solids, an excess of amide can be employed if desired to facilitate mixing and heat control during the sulfation reaction. Excess amide can, for example, be admixed with the activated colloid prior to the sulfation step, can be employed in excess in the formation of the sulfur trioxide-amide complex, or can be simply added to the reaction mixture along with the sulfur trioxide complex and the activated colloid.

In conducting the sulfation reaction, I have found that a reaction temperature of about 0° C. to about 25° C. is suitable, and that preferably the reaction temperature is maintained below about 15° C. The reaction time required for complete esterification is generally from about one to several hours, depending upon the selected temperature and the relative concentrations of the reactants, including diluent and sulfur trioxide-amide complex, in the reaction mixture. In general, I use a reaction time of about 1 to about 8 hours and preferably 2 to 3 hours.

The product which is obtained by esterification may be neutralized by adding a calculated amount of a suitable base to the reaction mixture. Essentially any base can be employed such as an alkali or alkaline earth metal hydroxide, carbonate, or bicarbonate, e.g., sodium carbonate, potassium hydroxide, magnesium hydroxide, calcium hydroxide, and the like. Further, compounds such as ammonium hydroxide, or any of the various ammonium compounds, or the various amines such as methyl amine, ethyl amine, propyl amine, and the like can be employed.

Also, the sulfated product may be neutralized by first diluting the reaction mixture with water and then adding a base, as defined above. If the base employed is water soluble, it can conveniently be added in the form of an aqueous solution. The neutralized product can be precipitated by the addition of a water miscible solvent in which the sulfated product is insoluble. Suitable water miscible solvents are those outlined previously and include, for example, acetone and the lower alcohols such as methanol and ethanol.

It should be understood that the esters prepared according to my invention are half esters of sulfuric acid. Thus, one of the hydrogen ions originally present in the sulfuric acid is still free to react with a base to form salts. The course of my process may be visualized as having one of the valencies of sulfuric acid esterified with a hydroxyl group of the Xanthomonas hydrophilic colloid, while the other hydrogen ion may be subsequently substituted by salt formation on the addition of a suitable base. This is merely a way of visualizing the reaction since the sulfation is accomplished through use of the sulfur trioxide-amide complex described previously and not through the use of sulfuric acid itself as a reactant.

To further illustrate my invention, there are presented the following examples in which all parts and percentages are by weight unless otherwise indicated:

EXAMPLE I

Nine gallons of a fermentation beer containing water and a *Xanthomonas campestris* hydrophilic colloid, as described previously, was acidified to a pH of 2 by the addition of dilute hydrochloric acid. The colloid was precipitated by adding the solution slowly to twice its volume of isopropanol after which the precipitated colloid was washed with methanol. A portion of the wet fiber, which was equivalent to 100 g. of the dry colloid, was washed 5 times with dimethyl formamide (DMF). This caused the fiber to swell, making filtration difficult. The material which contained about 400 g. of DMF (assuming essentially all the liquid in the fiber to be DMF) was reacted with 260 g. of a sulfur trioxide-dimethyl formamide ($SO_3$—DMF) complex with the reaction being carried out in a Day Mixer while cooling with ice water. The $SO_3$—DMF complex contained 100% excess of DMF, i.e., two moles of DMF for each mole of $SO_3$. The reaction product was dissolved in ice water and neutralized with sodium hydroxide. The sodium salt was precipitated by adding the solution to methanol, was washed with methanol and dried at 450° C. The yield of product was 183 g. and the degree of substitution (D.S.) was 0.96. A 1% aqueous solution of the product had a viscosity of 31.1 cps.; a 1% aqueous solution of the product which had been reprecipitated from methanol had a viscosity of 48.7 cps., and a 1% aqueous solution of the reprecipitated and dialyzed product had a viscosity of 201 cps.

In the above example and those following, the sulfated product was reprecipitated from methanol or acetone before determination of the D.S. The D.S. was determined by adding an aliquot of the sodium salt of the sulfated Xanthomonas hydrophilic colloid to a 10% aqueous solution of hydrogen chloride. The mixture was heated overnight, e.g., 15–20 hours, at reflux. The free sulfuric acid which was released was then determined gravimetrically by adding barium chloride to precipitate the sulfate ion as barium sulfate which was collected and weighed. This is a standard analytical procedure.

The viscosities of aqueous solutions of my sulfated products, as reported in the previous example and those following were measured at 25° C. using a Brookfield Viscometer, Model LVF, using the appropriate spindle rotating at 60 r.p.m.

EXAMPLE II

A 100 gram portion (dry basis) of activated Xanothomonas hydrophilic colloid prepared directly from the final fermentation beer, as described in Example I, was washed 3 times with methanol and dried in a warm air stream. It was then mixed with 530 cc. of DMF, cooled at 7° C. for one hour, and then sulfated using the sulfation complex and general reaction conditions described in Example I. After a reaction time of 2 hours, methanol was added and the separated solids were squeezed out on a Büchner funnel, resuspended in alcohol, and filtered off again. This material was dissolved in ice water, neutralized with sodium hydroxide and precipitated with methanol. After drying in warm air stream, the yield was 75 g. of product. The D.S. of the product was 0.1, and the viscosities of 1% aqueous solutions of the product were 2580 cps. (as prepared), 4,110 cps. (reprecipitated from methanol), and 4,360 cps. (reprecipitated and dialyzed).

As shown by the above example, drying of the activated colloid prior to sulfation resulted in a great reduction in the D.S. of the product. This demonstrates the importance of maintaining the activated colloid in a wetted state prior to the sulfation reaction so as to prevent deactivation of the colloid with a resultant decrease in the D.S. of the product.

EXAMPLE III

Activated *Xanthomonas campestris* hydrophilic colloid was prepared in the manner described in Example I. The precipitated colloid was washed once with isopropanol, and then washed 3 times with acetone. The wet fiber was then mixed with DMF (500 g. DMF/100 g. of colloid-dry basis) for 30 minutes in the Day Mixer while cooling with ice water. A sulfation complex, as described in Example 1, was added and mixing was continued for 3 hours. Solids were then precipitated by adding a mixture of acetone and methanol to the mix. The precipitated solids were filtered off and washed with acetone-methanol mixture. The washed product was dissolved in water and neutralized with sodium hydroxide. The sodium salt was then precipitated through addition to methanol and the precipitate was dried. The data and results of several test runs carried out in the above described manner are set forth in the following table. In each of the test runs, 100 grams of activated colloid were employed while the amount of the $SO_3$—DMF sulfation complex was varied from run to run.

TABLE

| Grams of $SO_3$-DMF complex | Yield of sulfated product (grams) | 1% viscosity (cps.) | D.S |
|---|---|---|---|
| 200 | 131.5 | 647 | 0.52 |
| 100 | 81.5 | 970 | 0.17 |
| 300 | 126.2 | 351 | 0.72 |

In the above table, the grams of sulfation complex including 100% excess of DMF, or two moles of DMF for each mole of $SO_3$, are set forth in column 1. The resulting yields of the sulfate ester of the *Xanthomonas campestris* hydrophilic colloid are set forth in column 2, and the viscosities of the products in a 1% aqueous solution at 25° C. (Brookfield Viscometer, Model LVF) are set forth in column 3. The degree of substitution (D.S.) after dialysis is set forth in column 4.

As shown in the above table, the D.S. of the products increased as the quantity of the $SO_3$-DMF sulfation complex was increased with respect to the amount of activated Xanthomonas hydrophilic colloid.

EXAMPLE IV

Six liters of a fermentation beer containing *Xanthomonas campestris* hydrophilic colloid (as described in Example I) was adjusted to a pH of 2 by the addition of concentrated hydrochloric acid and poured slowly and with stirring into 16 liters of glacial acetic acid. Four more liters of acetic acid and one liter of acetone were added, and the resulting solids were removed and washed 4 times with acetic acid, while squeezing out each time on a Büchner funnel. Eighty-five grams of activated Xanthomonas hydrophilic colloid (dry basis) were recovered. The wet fiber was mixed with 340 cc. of DMF, cooled overnight at 5° C., and reacted with 340 g. of $SO_3$-DMF complex (prepared as in Example I) for 2.5 hours. The reaction product was washed twice with a mixture of acetone and methanol, dissolved in ice water and neutralized with sodium hydroxide. The sodium salt was precipitated by addition of the solution to methanol and dried at 45° C. in the presence of an air stream. The yield of sulfated product was 111 grams, and its D.S. was 0.98. Its viscosity in a 1% aqueous solution was 1,104 cps.

As shown by the foregoing examples, my invention provides sulfate esters of essentially undegraded Xanthomonas hydrophilic coloids and the salts thereof. The viscosities of the materials prepared according to my invention are generally in excess of about 40 cps. and after purification, i.e., salt removal, are in excess of about 200 cps. in a 1% aqueous solution. The viscosities referred to are measured at 25° C. using a Model LVF Brookfield Viscometer. These viscosities clearly show that the materials are colloidal in nature and contain the essentially undegraded structure of the Xanthomonas hydrophilic colloid. The D.S. of the sulfated products generally ranges up to about 1 depending on the quantity of the sulfation complex employed.

Although I have demonstrated my invention by reference to sulfate esters of *Xanthomonas campestris* hydrophilic colloid, it should be understood that relatively undegraded sulfate esters of other Xanthomonas hydrophilic colloids such as those produced by the bacteria *Xanthomonas malvacearum*, *Xanthomonas carotae*, *Xanthomonas begoniae*, and *Xanthomonas incanae*, are part of my invention and may be prepared by the foregoing procedure. Also included in my invention are the salts of essentially undegraded sulfate esters of such other Xanthomonas hydrophilic colloids.

My novel products can be employed as viscosity and emulsion stabilizers in certain products which contain proteins. To illustrate, it has been found that my products can be employed for preparing thickened glues.

A glue was prepared by adding 15 parts of dried bone glue (CX Bone Glue, Armour and Company, Adhesive Division, 1355 West 31st Street, Chicago, Ill.), to 105 parts of water. The mixture was heated to solubilize the bone glue and was then cooled. The resulting glue had a viscosity at 45° C. of 12 cps. and a viscosity at 250° C. of 18 cps.

A further glue was prepared by adding 13.5 parts of CX Bone Glue, and 1:5 parts of the sodium salt of an essentially undegraded sulfate ester of *Xanthomonas campestris* hydrophilic colloid having a D.S. of 0.52 to 105 parts of water. After heating to solubilize the ingredients and cooling, the resulting glue was found to have a viscosity of 2,350 cps. at 45° C. and 16,000 cps. at 25°

C. A further glue was prepared by adding 0.5 parts of CX Bone Glue and 1.5 parts of the sodium salt of an essentially undegraded sulfate ester of *Xanthomonas campestris* hydrophilic colloid having a D.S. of 0.71 to 105 parts of water. The resulting glue had a viscosity at 45° C. of 1280 cps. and a viscosity at 25° C. of 8,000 cps.

As shown by the above data, those glues which contained an essentially undegraded sulfate ester of a *Xanthomonas campestris* hydrophilic coolold prepared according to my invention had much higher viscosities than a glue containing only bone glue and water. The thickened glues containing an essentially undegraded ester of a Xanthomonas hydrophilic colloid may, for example, be employed on a vertical surface where other glues would have a tendency to run and give uneven covering and non-uniform adhesion.

In the foregoing description, I have referred to various temperatures, times, concentrations and the like. These references to specific conditions have been solely for purposes of illustration. Thus, I desire that my invention be limited only by the lawful scope of the appended claims.

What I claim is:
1. An essentially undegraded sulfate ester of a Xanthomonas hydrophilic colloid and the base neutralized salts thereof.
2. The product of claim 1 wherein said colloid is a *Xanthomonas campestris* hydrophilic colloid.
3. The product of claim 1, wherein said colloid is a *Xanthomonas malvacearum* hydrophilic colloid.
4. The product of claim 1, wherein said Xanthomonas hydrophilic colloid has a degree of substitution ranging up to about 1.
5. The product of claim 4, wherein said salt is selected from the group consisting of alkali metal, alkaline earth metal, amomnium and amine salts.
6. Process for preparing an essentially undegraded sulfate ester of a Xanthomonas hydrophilic colloid, said process comprising acidifying a Xanthomonas hydrophilic colloid in aqueous medium, precipitating said acidified colloid, removing substantially all of the water from said precipitated colloid while maintaining said colloid in a wetted state, and reacting said wetted colloid with a sulfur trioxide-dialkyl amide sulfation complex in which the amide has a formula

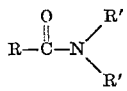

wherein R' is a lower alkyl radical and R is selected from the class consisting of hydrogen and a lower alkyl radical.
7. The process of claim 6, wherein said amide is present in excess in said sulfation complex.
8. The process of claim 6, wherein said acidified Xanthomonas hydrophilic colloid is precipitated from an aqueous medium by the addition thereto of a water-miscible organic solvent which is not a solvent for said acidified Xanthomonas hydrophilic colloid.
9. The process of claim 8, wherein said water-miscible organic solvent is a lower alcohol.
10. The process of claim 8, wherein said water-miscible organic solvent is acetone.
11. The process of claim 6, wherein amide is dimethyl formamide.
12. The process of claim 6, wherein said sulfation reaction is carried out at a temperature from about 0° C. to about 25° C.
13. The process of claim 12, wherein said sulfation reaction is carried out at a temperature below about 15° C.
14. The process of claim 6, including the additional step of neutralizing said essentially undegraded sulfate ester of a Xanthomonas hydrophilic colloid.
15. The process of claim 6, wherein said Xanthomonas hydrophilic colloid is prepared by the bacterium *Xanthomonas campestris*.
16. The process of claim 6, wherein said Xanthomonas hydrophilic colloid is prepared by the bacterium *Xanthomonas malvacearum*.

References Cited

UNITED STATES PATENTS

| | | | |
|---|---|---|---|
| 3,020,206 | 2/1962 | Patton et al. | 260—209 |
| 3,163,602 | 12/1964 | Lindblom et al. | 260—209 |
| 3,200,110 | 8/1965 | Gollin et al. | 260—234 |
| 3,232,929 | 2/1966 | McNeely et al. | 260—209 |
| 3,256,271 | 6/1966 | Schweiger | 260—234 |

LEWIS GOTTS, *Primary Examiner.*

J. R. BROWN, *Assistant Examiner.*

U.S. Cl. X.R.

106—126; 195—31